United States Patent [19]

Kozuki et al.

[11] Patent Number: 4,841,380
[45] Date of Patent: Jun. 20, 1989

[54] REPRODUCING APPARATUS FOR INTERMITTENTLY DRIVING RECORDING MEDIUM

[75] Inventors: Susumu Kozuki; Keiji Satoh, both of Tokyo, Japan

[73] Assignee: Canon Kabushiki Kaisha, Tokyo, Japan

[21] Appl. No.: 936,843

[22] Filed: Dec. 2, 1986

[30] Foreign Application Priority Data

Dec. 5, 1985 [JP] Japan ................................. 60-272600

[51] Int. Cl.⁴ ..................... H04N 5/783; G11B 15/52
[52] U.S. Cl. .................................. 360/10.2; 360/74.4; 360/77.14
[58] Field of Search ..................... 360/9.1, 10.1–10.3, 360/11.1, 71, 18, 27, 73, 74.1, 74.4, 77, 69; 369/43, 47

[56] References Cited

U.S. PATENT DOCUMENTS 4,581,658  4/1986  Azuma et al. ..................... 360/10.2
4,680,648  7/1987  Takayama .......................... 360/10.2
4,683,503  7/1987  Takimoto ............................ 360/73

*Primary Examiner*—Alan Faber
*Assistant Examiner*—Steven R. Garland
*Attorney, Agent, or Firm*—Robin, Blecker & Daley

[57] ABSTRACT

An apparatus for reproducing recorded signals from a recording medium in which a plurality of oblique tracks are formed in parallel is characterized in that the recording medium is intermittently driven at timings which are determined by using the tracking error signals indicating the tracking error of heads formed by using the outputs of the reproducing heads, and these timings are controlled in correspondence with the track pitch of the tracks. 4(A)–4(E), 5(A)–5(E), 6(A)–6(D), and 7(A)–7(D).

11 Claims, 7 Drawing Sheets

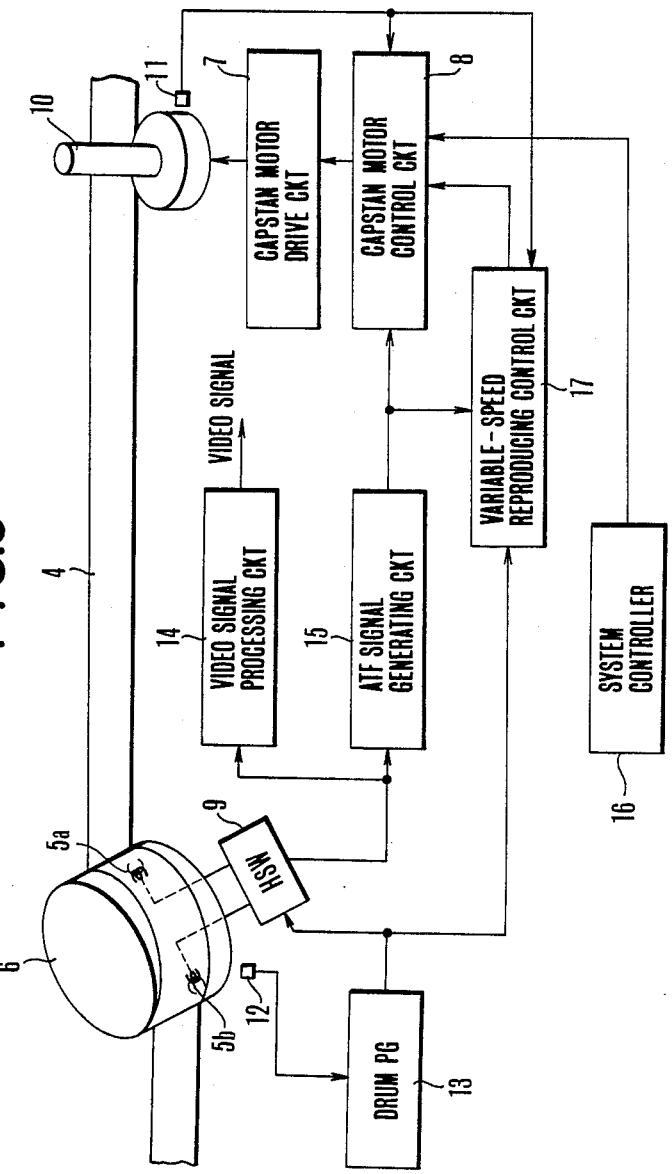

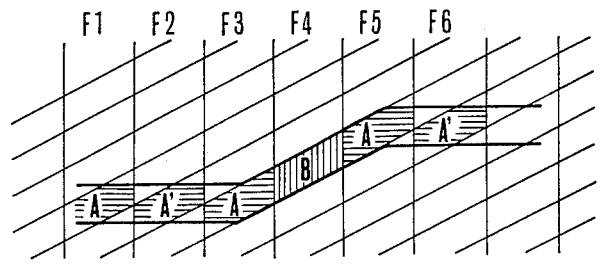
FIG.4(A)
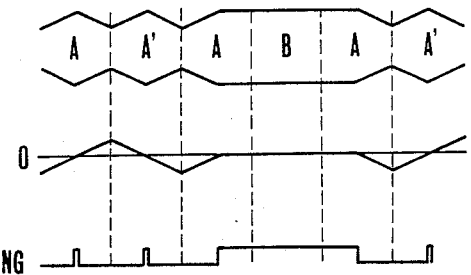
FIG.4(B)
FIG.4(C)
FIG.4(D) TRUE TRACKING
FIG.4(E) CAPSTAN MOTOR
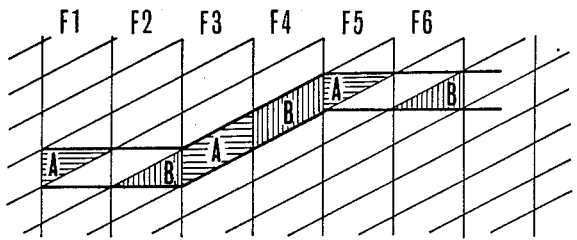
FIG.5(A)
FIG.5(B)
FIG.5(C)
FIG.5(D) TRUE TRACKING
FIG.5(E) CAPSTAN MOTOR

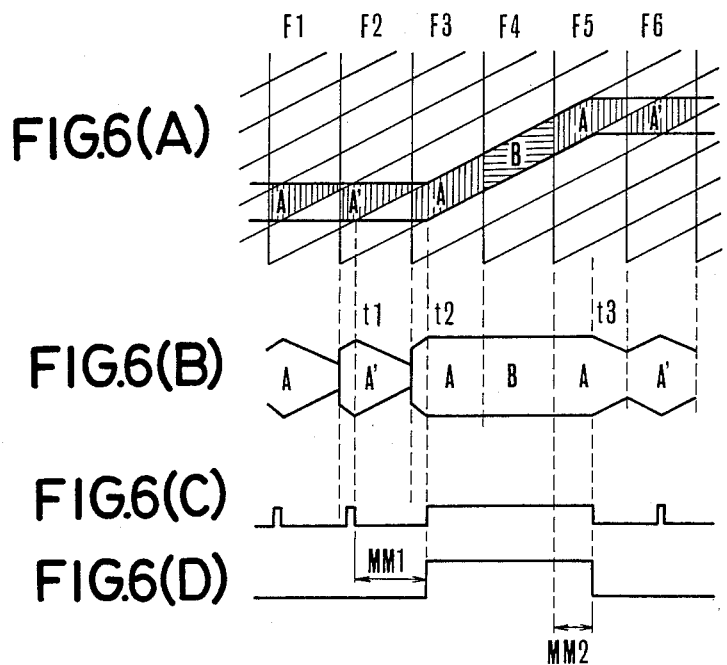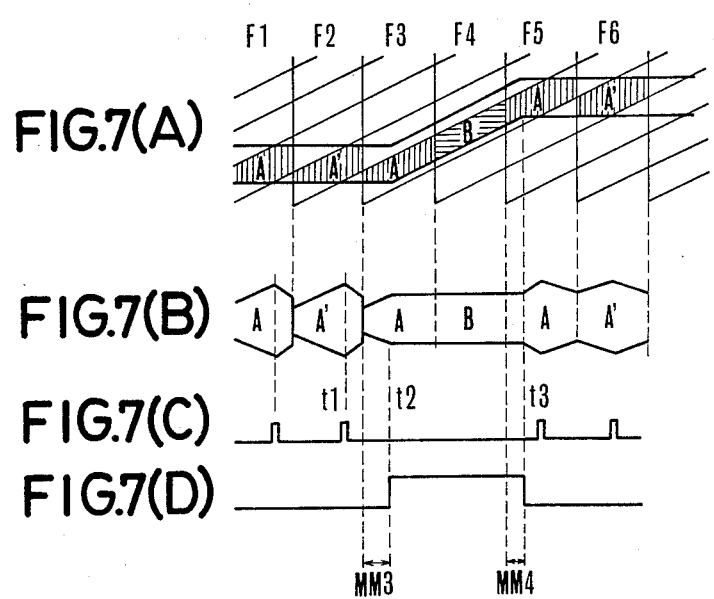

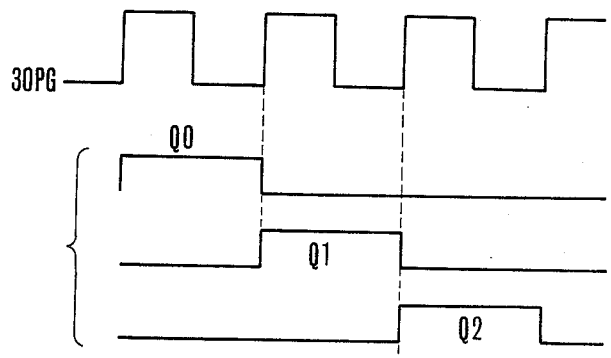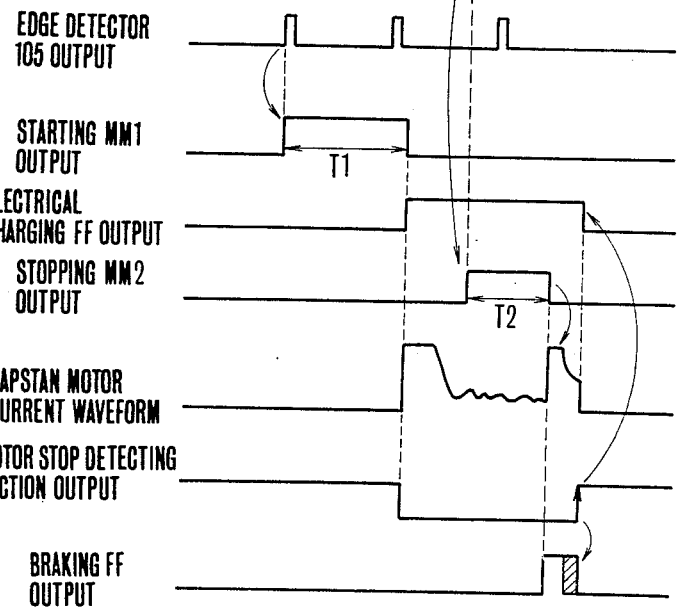

REPRODUCING APPARATUS FOR INTERMITTENTLY DRIVING RECORDING MEDIUM

BACKGROUND OF THE INVENTION

1. Field of the Invention

The present invention relates to a reproducing apparatus, and particularly to an apparatus for reproducing recorded signals while intermittently driving a recording medium.

2. Description of the Related Art

This type of apparatus includes a conventionally known helical scanning-type video tape recorder (VTR), which will be described as an example hereinafter. Conventional tracking control means for correctly tracing tracks which have been recorded on the tape of a VTR at a given pitch include conventional means which operate by use of control signals (CTL system) and another type which has been recently proposed due to the demand for highly densified recording, exemplified by the so-called four-frequency system, which operates by use of a reproduced output from a rotational head without recording control signals in the direction of the length of a tape.

In the above tracking control means which uses reproduced signals from a rotational head, there is no signal directly indicating the phase relationship between a magnetic head and a track as compared with the former CTL system. Thus, it is difficult to obtain good reproduced output by correctly controlling the tracking of a magnetic head for tracing a recording medium, particularly when intermittently running a tape for the purpose of special types of reproduction such as still reproduction and slow motion reproduction.

Furthermore, certain types of VTR which are capable of setting two or more different track pitches by changing-over the tape running speeds and performing record reproduction have recently been commercialized. In these types of VTR, when the above-described tracking control using reproduced signals from a rotational head is performed, the tracking control becomes more difficult during the above-mentioned special types of reproduction which is effected by means of intermittent running. This is caused by the sensitivity of the tracking error signals produced by using the reproduced signals from a rotational head (this sensitivity depending upon the track pitch), and the characteristics with respect to starting and stopping which depend upon the distance run in a single advance of the tape during intermittent running.

SUMMARY OF THE INVENTION

It is an object of the present invention to solve the above-mentioned problems.

It is another object of the present invention to provide a reproducing apparatus which is capable of conducting effective reproduction while intermittently advancing a recording medium regardless of the track pitch employed.

To this end, the present invention presents, as an embodiment, an apparatus for reproducing recorded signals from a recording medium in which a plurality of tracks are formed in parallel, comprising reproducing heads; means for forming tracking error signals indicating any tracking error of the reproducing heads by using output therefrom; conveying means for intermittently carrying the recording medium in the direction in which it crosses the tracks; means for determining a start timing and a stop timing at which the conveying of the recording medium by the conveying means is started and stopped, the means determining either the start timing or the stop timing, or both, by utilizing the tracking error signals; means for generating information with respect to the track pitch of the tracks; and means for controlling at least one of the start timing and the stop timing as determined by the determining means on the basis of information generated from the generating means.

It is a further object of the present invention to provide a video signal reproducing apparatus in which no control signal with respect to the track pitch is recorded in the direction of running of a recording medium and which is capable of effectively conducting slow motion reproduction even if a plurality of track pitches are set therein.

For this object, the present invention presents, as an embodiment, an apparatus for reproducing video signals from a tape-formed recording medium in which a plurality of tracks respectively having video signals recorded thereon are formed in parallel in the transverse direction of the recording medium, comprising rotational heads for reproducing the video signals by means of tracing the tape-formed recording medium; means for forming tracking error signals indicating positional shifts of the rotational heads relative to one of the plurality of tracks by using signals reproduced by the rotational heads; means for conveying the tape-formed recording medium in the direction of its length; first formation means for forming a first timing signal with respect to the start timing at which the conveying of the recording medium by the conveying means is started; second formation means for forming a second timing signal with respect to the stop timing at which the conveying of the recording medium by the conveying means is stopped, at least one of the first and second timing signals being formed on the basis of the tracking error signals; means for generating information with respect to the track pitch of the tracks; and means for switching the characteristics of either the first or second formation means in dependence upon information generated from the generating means.

Other objects and the characteristics of the present invention will become apparent from a reading of the following detailed description of embodiments thereof with reference to the drawings.

BRIEF DESCRIPTION OF THE DRAWINGS

FIG. 3 is a block diagram showing the schematic configuration of a VTR to which the present invention relates;

FIGS. 4(A)–4(E), 5(A)–5(E), 6(A)–6(D), and 7(A)–7(D), are explanatory views of the operation of a variable-speed reproducing control circuit in FIG. 3;

FIGS. 10(A) to 10(I) are timing charts showing the wave form in each of the sections shown in FIG. 8.

DETAILED DESCRIPTION OF THE PREFERRED EMBODIMENTS

In the embodiment described below, the present invention is applied to a VTR in which the known four-frequency pilot system is employed as a tracking means.

Firstly, the trace loci of a head and a track and a tracking error signal (ATF signal) indicating a gap between the head and the track during still reproduction will be described. Description is made of still reproduction (a so-called frame still) in a rotating 2-head VTR in which video signals in two fields are reproduced in succession.

Figure 1A:
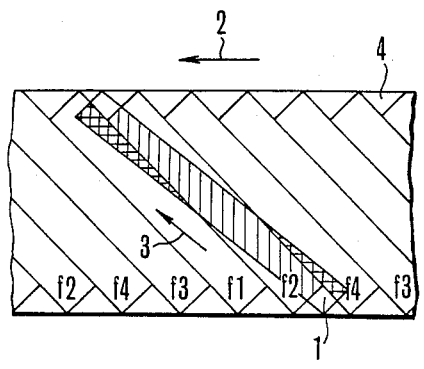
FIGS. 1(A) and 1(B) are drawings showing the state of a tape and a head and the timing of each signal when the tape is stopped.
Figure 1B:
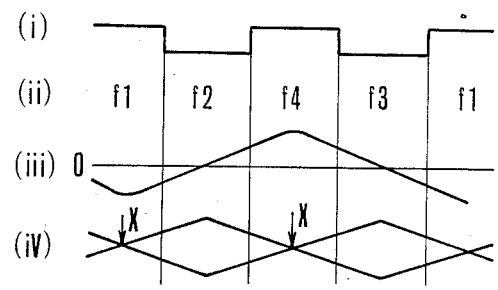
Figure 2A:
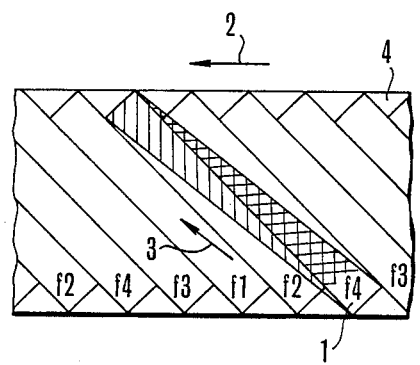
FIGS. 2(A) and 2(B) are drawings showing the state of a tape and a head and the timing of each signal when the tape is stopped at a different position from that in FIG. 1.
Figure 2B:
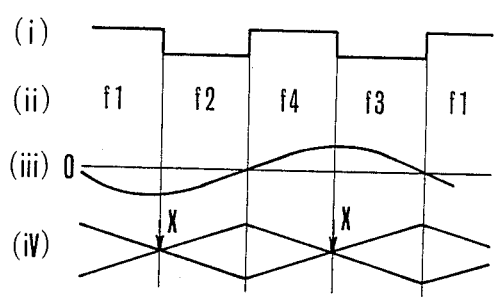

FIGS. 1(A) and 1(B) are drawings showing the state of a magnetic tape and the timing of each signal when the tape is stopped. FIGS. 2(A) and 2(B) are drawings showing the state of the tape and the timing of each signal when the tape is stopped at a different position from that in FIGS. 1(A) and 1(B).

In FIGS. 1(A) and 2(A), reference number 1 denotes trace loci of the heads; reference number 2, the running direction of the tape; reference number 3, the tracing direction of the heads; reference number 4, the tape; and $f_1$ to $f_4$ denote tracks in which pilot signals respectively having frequencies $f_1$ to $f_4$ are recorded. Furthermore, in FIGS. 1(B) and 2(B), (i) denotes a head switching signal of 30 Hz (30 PG) which is synchronized with the rotation of a rotating head; (ii), the frequency of the pilot signal recorded in a track in which a video signal is reproduced; (iii), an ATF signal; and (iv), an envelope wave form.

During still reproduction, since there is a gap of one track pitch between the trace locus of the head and the video track in one field, the ATF signal (iii) produces a swell of one cycle in four fields as shown in FIGS. 1(B) and 2(B). When the tape is now stopped in the state shown in FIG. 1(A), the maximum points of the output of one head become video signals in a picture and the minimum points (shown by X in the figure) of the output of the other head also become video signals in a picture, and a noise bar therefore appears in the picture reproduced.

Therefore, so-called field still reproduction is also proposed, in which usually-used two heads A and B having azimuth angles different from each other are provided, and a head A' having the same azimuth angle as that of the head A with a large head output in the state shown in FIG. 1(A) is provided in the vicinity of the head B so as to allow still reproduction to be performed by using the heads A and A'.

On the other hand, in order to avoid production of a noise bar in a picture when using the heads A and B alone, the maximum output and minimum output points of the heads are made to coincide with the head switching points, as shown in FIG. 2(B). In other words, the positions at which the heads are introduced are such that they coincide with the track to be reproduced or the adjacent tracks. When the ATF signals at this time are considered, the ATF signal at the level 0 (to be precise, a level $V_J$ which is determined in accordance with differences in frequency characteristics) means a state in which the heads precisely trace the recorded track loci, and thus if the ATF signal is at the level 0 during the head switching, it will be found that good still reproduction can be realized. This is called frame still reproduction. The above-described still reproduction, which is performed without producing any noise bar, and the relationship between such reproduction and the ATF signals are generally established if the recording track patterns shown in FIGS. 1(A) and 2(A) are recorded at any track pitch.

FIG. 3 is a block diagram showing the schematic configuration of a VTR for conducting slow motion reproduction by advancing the tape intermittently without producing any noise bar.

In FIG. 3, reference numbers 5a and 5b denote the respective rotational reproducing heads. The heads 5a and 5b have magnetization directions which are different from each other. Reference number 6 denotes a cylinder provided with the rotating heads 5a and 5b, a magnetic tape 4 being led over the outer peripheral surface thereof. The signals reproduced by the heads 5a, 5b are changed to continuous signals through a head switching circuit(HSW) 9 and supplied to a video signal processing circuit 14 and an ATF signal generating circuit 15. The HSW 9 is controlled by the 30 PG signals obtained from a detector 12 and a generator 13.

The video signal components are separated from the continuous signals obtained from the HSW 9, are returned to the original signal form (for example, video signals which are similar to NTSC signals) by the video signal processing circuit 14, and then are output. On the other hand, only the pilot signal components are separated from the continuous signals by the ATF signal generating circuit 15 and ATF signals are obtained by a known type of signal processing. One example of such signal processing will be explained in brief. The reproduced pilot signals contained in the reproduced signals from the heads are multiplied by signals (local pilot signals) having the same frequency as the pilot signals superposed on an object control track (a main track) to be reproduced and the level of the frequency signals is compared with that of the pilot signals reproduced from both the tracks adjacent to the main track, the tracking error thereby being detected and the AT signals obtained.

The ATF signals obtained in such a manner are supplied to a capstan motor control circuit 8 and a capstan 10 is usually controlled through a capstan motor drive circuit 7 during reproduction. The capstan 10 causes the tape 4 to run by cooperating with a pinch roller (not shown) as is generally known. The rotation of the capstan 10 is detected by a detector 11 from which, for example, X pulses are generated in one rotation of the capstan 10, these pulses being supplied as so-called capstan FG signals to the capstan motor control circuit 8 and the variable-speed reproducing control circuit 17 described in detail below. As these capstan FG signals are supplied to the capstan motor control circuit 8, they form a speed control loop.

The variable-speed reproducing control circuit 17 is a circuit for performing rotational control of the capstan 10 during still reproduction or slow motion reproduction by using the above-described 30 PG signals, the capstan signals, the ATF signals, and signals obtained from a system controller 16. An example of the operation of the variable-speed reproducing control circuit 17 will be explained with reference to FIGS. 4(A) to 4(E), 5(A) to 5(E), 6(A) to 6(D), and 7(A) to 7(D).

FIGS. 4(A), 5(A), 6(A), and 7(A) show the relationship between the heads and the reproduced signals;

FIGS. 4(B), 5(B), 6(B), and 7(B), the envelopes of the reproduced signals; FIGS. 4(C), 5(C), 6(C), and 7(C), the ATF signals; FIGS. 4(D), 5(D), 6(D), and 7(D), the signals indicating the timing of true tracking; and FIGS. 4(E) and 5(E), the current waveforms of the capstan motor.

In FIGS. 4(A) to 7(D), $F_1$, $F_2$, $F_3$ . . . denote each field of a picture being reproduced, oblique lines in each field denote the respective tape-formed track, and hatching portions denote portions from which reproduced signals are obtained. When there are three heads, they are denoted by A, A', and B, and when there are only two heads, they are denoted by A and B.

Prior to the description of the characteristics of the present invention, the track patterns of an intermittent slow motion reproduction operation involving still reproduction will be analyzed with reference to FIGS. 4(A) to 7(D).

FIG. 4(A) shows an ideal track trace drawing in a three head-type filed slow motion reproduction performed by still reproduction and normal reproduction operations in which the heads A and B having azimuth angles reverse to each other are opposed to each other and the head A' having the same azimuth angle as the head A is adjacent to the head B.

In a first field $F_1$, the head A is in a still reproduction state and traces with a timing phase that allows the reproduction envelope to become the maximum at the center of the field. In the next field $F_2$, the head A' having the same azimuth angle as and opposed to the head A traces this field. It traces with the same timing phase as the head A tracing the field $F_1$, i.e., in such a manner that the just tracking is performed at the center of the field.

In a field $F_3$, the head A again does the tracing and the tape running starts at the center of the field, the trace loci being changed as shown in FIG. 4(A). Namely, the head A traces the same trace locus in a field $F_4$ as that during recording from the center of the field $F_3$, and the head B having the reverse azimuth angles performs a true tracking and tracing, while in a field $F_5$, an ordinary tape running operation is carried out as far as an intermediate point and the head A does the tracing in the latter half of this field in a still mode as shown in the figure.

FIG. 4(B) shows the change in the envelope of the reproduced signals in the tracing state and FIG. 4(C) shows the ATF signal. That is to say, a zero crossing takes place at the center of field $F_1$ and again at the center of the next field $F_2$ and the voltage of the ATF signal becomes substantially zero in the latter half of the field $F_3$, this state continuing in the later tracing.

FIG. 4(D) shows the pulses indicating the true tracking points obtained by using the ATF signal.

FIG. 4(E) shows the drive timing of the motor when an ideal tape running operation is being carried out, during which the tape is run for two tracks in a period equivalent to one whole frame from the center of the field $F_3$ to the center of the field $F_5$. In other words, the head A always performs the true tracking at the center of a field from the still state. When the tracking is normal from the start of a field still reproduction, the timing pulse of the tape running may be a pulse produced for just one frame from the timing at the center of a field.

FIGS. 5(A) to 5(E) show a so-called frame still reproduction in which the still reproduction is not carried out by using the heads having the same azimuth angle, but instead slow motion reproduction is carried out by alternating still and normal reproduction operations using only the heads A and B having azimuth angles which are reverse to each other.

In FIG. 5(A), the heads A and B are doing tracing in the fields $F_1$ and $F_2$ in the optimum state of tracking for frame still reproduction. The tape starts to run from the starting point of the field $F_3$ and runs for one frame until the end point of the next field $F_4$, and then the heads A and B trace again in the fields $F_5$ and $F_6$ in the state of still reproduction.

In FIG. 5(B), the envelopes of the reproduced signals are shown in optimum state described above, FIG. 5(C) shows the ATF signal in such a state, and FIG. 5(D) shows a pulse indicating the true tracking points obtained from the ATF signal.

FIG. 5(E) shows a control signal for a tape running operation in such an optimum state, it being a control signal of just one frame from the starting point of a frame.

FIGS. 4(A) to 4(E) and 5(A) to 5(E) illustrate the optimum state for tracking during still reproduction, but, in general this state is not completely known.

FIGS. 6(A) to 6(D) show a case in which still reproduction starts in a state wherein the tape does not stop at an ideal position and field slow reproduction is performed by the ideal tape intermittent running shown in FIGS. 4(A) to 4(E).

In these drawings, $t_1$ denotes the timing at which the level of the ATF signal during still reproduction becomes zero. If the tape is started at a timing $t_2$ ($t_2 = t_1 + MM_1$) which occurs after a period of $MM_1$ has passed from this timing $t_1$, the head A coincides with a track locus. The timing $t_2$ is a tape-start timing that satisfies the above conditions and $t_3$ is a tape-stop timing. When the tape is started at the timing $t_2$ and the tape running is stopped at the timing $t_3$, the heads reproduce two fields and then stop. A time $MM_2$ is an ideal passage of time during which the tape is to be stopped at the starting point of the third field after it has been run for two fields, i.e. two tracks.

In FIG. 6(A), the tracking state for the frame still reproduction deviates from the ideal state during the still reproduction in the fields $F_1$ and $F_2$. Namely, in the ideal case, the envelopes of the reproduced signals are maximum at the field centers and the just tracking pulse is to be generated at these centers, but in this case, the level of the ATF signal is zero at the timing $t_1$, as shown in FIGS. 6(B) and 6(C). In this case, as shown in FIG. 6(D), tape running is started after the predetermined time constant $MM_1$ passes from the timing $t_1$, i.e., at the timing $t_2$. That is, the tape is in the true tracking state at the timing $t_2$ in the field $F_3$, is run in the fields $F_3$ and $F_4$, and then stopped at the timing $t_3$ until the predetermined time constant $MM_2$ has passed from the starting point of the field $F_5$.

In the case shown in FIGS. 6(A) to 6(D), the tape running starts at the timing $t_2$ which is determined by the given time constant $MM_1$ from the timing $t_1$ of the true tracking of the ATF signal during the still reproduction, and it is stopped at the timing $t_3$ which is determined by the given time constant $MM_2$ from the field switching timing of the heads.

The time $MM_1$ is ideally a period corresponding to one field, i.e. one track, and $MM_2$ is a period corresponding to half a field, i.e. half a track. However, the time $MM_1$ is a previously-regulated value in consideration of the start delay of the motor at the time of starting and the time delay which takes place before the actual start of tape running, and the time $MM_2$ is also previously regulated in consideration of the inertia of the motor when stopped and the inertia present until the actual tape-running stops.

Another system is next described with reference to FIGS. 7(A) to 7(D).

In the drawings, a time $MM_3$ is an ideal passage time which has previously been set from the head-switching timing to the timing $t_2$ of the tape-running start and a time $MM_4$ is a passage time from the head-switching timing to the tape-stop timing which are determined by a method described below so that the head A is at the center of the field and the envelope of the reproduced signal becomes maximum during the still reproduction after the tape stop.

The system shown in FIGS. 7(A) to 7(D) is adopted for the purpose of correcting the deviation of the track at the start by using the timing at the tape-running stop.

In FIGS. 7(A) to 7(D), in the initial state of a still reproduction, the position of the true tracking, i.e., the timing $t_1$ at which the level of the ATF signal becomes zero, deviates from the center of the field $F_2$. In this case, the timing $t_2$ of the tape-running start is the moment which occurs after a given time $MM_3$ has passed from the head-switching timing. If the tape starts to run at the timing $t_2$, the tracking is usually not made in a reproduction. Therefore, the tape-running stop timing, i.e. the time $MM_4$, is set by the ATF signal in the period of the reproduction effected in the field $F_4$.

Namely, the state shown in FIGS. 7(A) to 7(D) illustrates a state in which the heads deviate upwardly from the true tracking state, and the ATF signal indicates a value corresponding to a positive or negative deviation and the timing of the tape-running stop is regulated in the period of the reproduction effected in the field $F_5$ corresponding to the ATF signal. For example, control is effected in such a manner that if the level of the ATF signal is zero, the time $MM_4$ is a period corresponding to half a field so that the timing $t_3$ comes substantially at the center of the field $F_5$, and if the level of the ATF signal is not zero, the time changes in correspondence with the degree of positive or negative deviation.

As regards a method of setting the tape-running start timing and the tape-running stop timing in the case of the intermittent fine slow reproductions shown in FIGS. 6(A) to 6(D) and 7(A) to 7(D) are the two following methods are suitable:

(I) a method in which a timing coming a certain time after the detection of the level of the ATF signal is determined; and (II) a method in which a timing coming a certain time after head-switching timing is determined.

It is necessary to previously regulate the respective times in correspondence with the deviation in quality and the mechanism of the motor employed.

It is possible to think of various combinations of the above two methods (I) and (II) with the tape-running start timing and the stop timing and with frame still or field still, and at least one of these timings may be determined by the method (I).

In a further possible development of such a tape-running control system for intermittent fine slow reproduction, the VTR of this embodiment may correspond to the selection of different speeds on the basis of various recording track pitches (an ordinary mode and an extended mode in which the track pitch is reduced by half for the purpose of obtaining a higher density recording). This is made necessary because such factors as the delay in rising and falling, and deviations in time with respect to the tape running and the motor rotation are completely different, due to use of different tape speeds.

Figure 8:
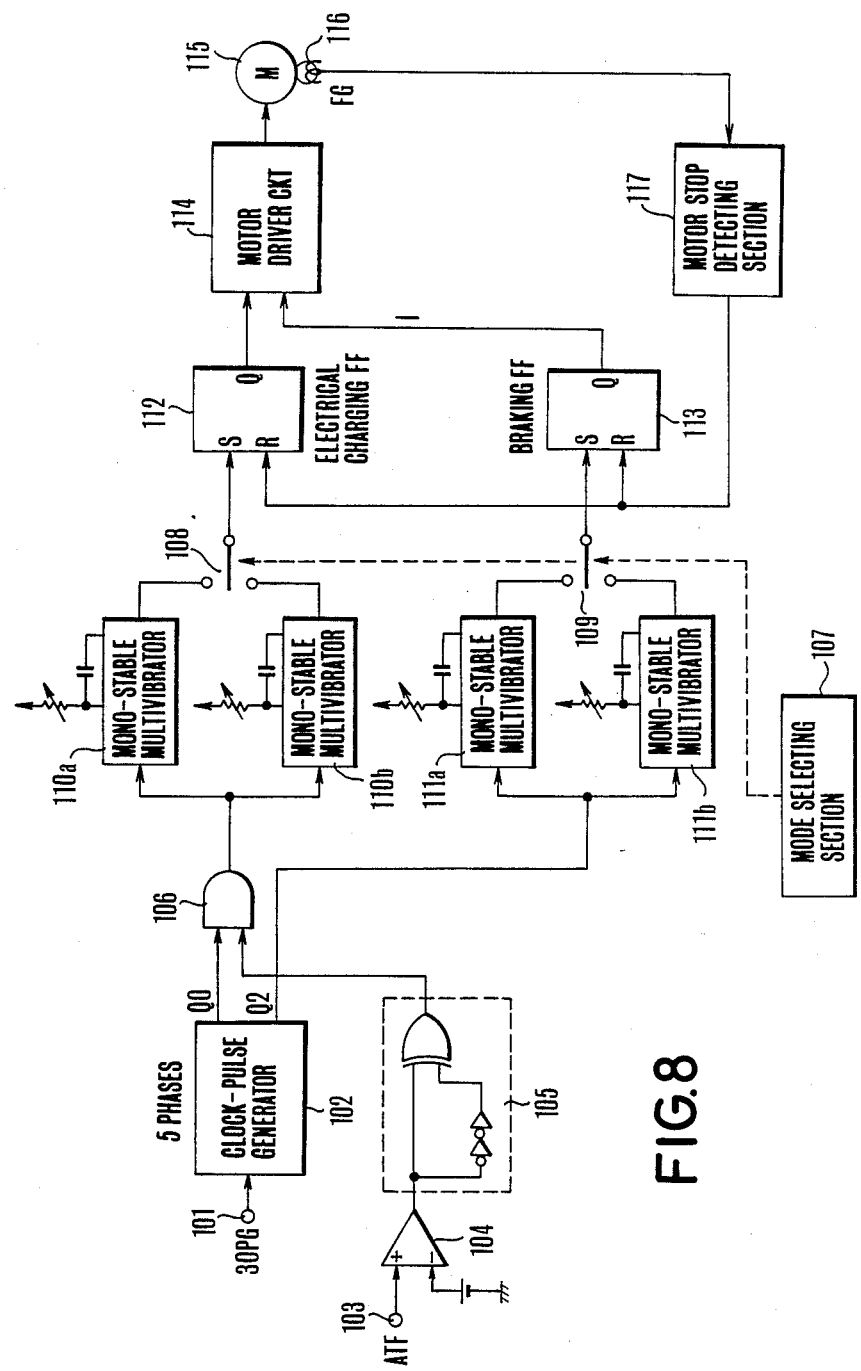
FIG. 8 is a block diagram showing the configuration of the important sections of a VTR embodying the present invention.

FIG. 8 is a block diagram showing the configuration of the main sections of a VTR of representing an embodiment of the present invention. This is a block diagram of the case in which only the tape-running start timing is determined in correspondence with the ATF signal.

In FIG. 8, reference numbers 101 and 103 denote terminals to which the 30 PG signal and the ATF signal are respectively inputted; reference number 102, a clock pulse generator; reference number 104, a comparator; reference number 105, an edge detector; reference number 106, an AND circuit; reference number 107, a mode selecting section; and reference numbers 108 and 109, switches. Reference numbers 110a and 110b denote mono-stable multi-vibrators having a time constant for setting a start timing and reference numbers 111a and 111b denote mono-stable multi-vibrators having a time constant for setting a stop timing. These two types of stable multi-vibrators respectively generate a first timing signal for starting and a second timing signal for stopping. Reference number 112 denotes a flip-flop (referred to as FF hereinafter) for charging with electricity; reference number 113, a FF for braking; reference number 114, a motor driver circuit; reference number 115, a capstan motor; reference number 116, a generator of a FG signal having a frequency corresponding to the rotation of the motor 115; and reference number 117, a motor stop detecting section.

FIGS. 10(A) to 10(I) are timing charts of the waveforms in the respective sections shown in FIG. 8. FIG. 10(A) shows the waveform of the 30 PG signal; FIG. 10(B), the waveform of a clock pulse output from the clock pulse generator 102; FIG. 10(C), the waveform of a true tracking pulse output from the edge detector 105; FIG. 10(D), the waveform of a pulse output from the mono-stable multi-vibrator 110a having a time constant (corresponding to $T_1$) for setting the start timing; FIG. 10(E) and 10(I), the waveforms output from the FF 112 for electrical charging and the FF 113 for braking, respectively; FIG. 10(F), the waveform of a pulse output from the mono-stable multi-vibrator 111a having a time constant corresponding to delay time $T_2$ for setting the stop timing; FIG. 10(G), the waveform of a current for driving the capstan motor 115; and FIG. 10 (H), the output waveform in the detection section 117 for detecting the stop of the capstan motor 115.

In the apparatus shown in FIG. 8, clock pulses $Q_0$ to $Q_4$ having 5 phases are output by the clock pulse generator 102 by using the 30 PG signal input from the terminal 101. On the other hand, the level of the ATF signal input from the terminal 103 is compared with a predetermined level corresponding to the true tracking by the comparator 104 and the edge of the output from this comparator 104 is detected by the edge detector 105 so that a true tracking pulse at a high level is produced at the time of the true tracking, as shown in FIG. 10(C). This true tracking pulse and the output $Q_0$ from the above-described clock pulse generator 102 are input in the AND circuit 106 and the output of the AND circuit 106 is input in the mono-stable multi-vibrators 110a and 110b having the time constants (corresponding to $T_1$, $T_3$) for determining the start timing. The output $Q_2$ from the clock pulse generator 102 is input in the mono-stable multi-vibrators 111a and 111b having the time constants T₂, T₄, respectively, for determining the stop timing. The mode selecting section 107 is a circuit for deciding a track pitch by means of automatic detection or manual operation by a user and, in response to the detected track pitch, generating a mode selecting signal for determining whether the tape driving to be performed during a particular reproduction operation is conducted in correspondence with an ordinary mode or an extended mode.

The mode selecting signal controls the switches 108 and 109 so that when a recording is performed in the ordinary mode, the switches 108 and 109 are connected to the mono-stable multi-vibrators 110a and 111a, respectively. When a recording is performed in the extended mode, the switches 108 and 109 are connected to the mono-stable multi-vibrators 110b and 111b, respectively.

The outputs of these switches 108 and 109 are respectively input in the S terminals of the FF 112 for electrical charging and of the FF 113 for braking and the outputs of the FF 112 and the FF 113 are input in the motor driver circuit 114. When a recording is performed in correspondence with the ordinary mode, the output waveform of the mono-stable multi-vibrator 110a for determining the start timing becomes that shown in FIG. 10(D), and the FF 112 is turned on after the predetermined time $T_1$ asses from the timing of the true tracking pulse generated in the region of the clock pulse $Q_0$. The mono-stable multi-vibrator 111a for the stop timing is triggered at the rising of the clock pulse $Q_2$ and the FF 113 is turned on at the timing previously set by the time constant $T_2$ so as to apply braking. The signals from the FF 112 and the FF 113 are input in the motor driver circuit 114 so that the drive capstan motor 115 is controlled by the motor current waveform as shown in FIG. 10(G).

Next, the stopped state of the motor is detected in the motor stop detecting section 117 by the FG signal obtained by detecting the rotation of the capstan motor 115 through the FG signal generator 116, and the above-described FF 112 and FF 113 are then reset.

The method in which the mono-stable multi-vibrators having the different time constants are switched for use by the recording mode selecting section 107 together with the timing charts in FIGS. 8 and 10(A) to 10(I) is described above, but it may be possible to switch the resistance values for determining the time constant by the same mono-stable multi vibrator.

Figure 9:
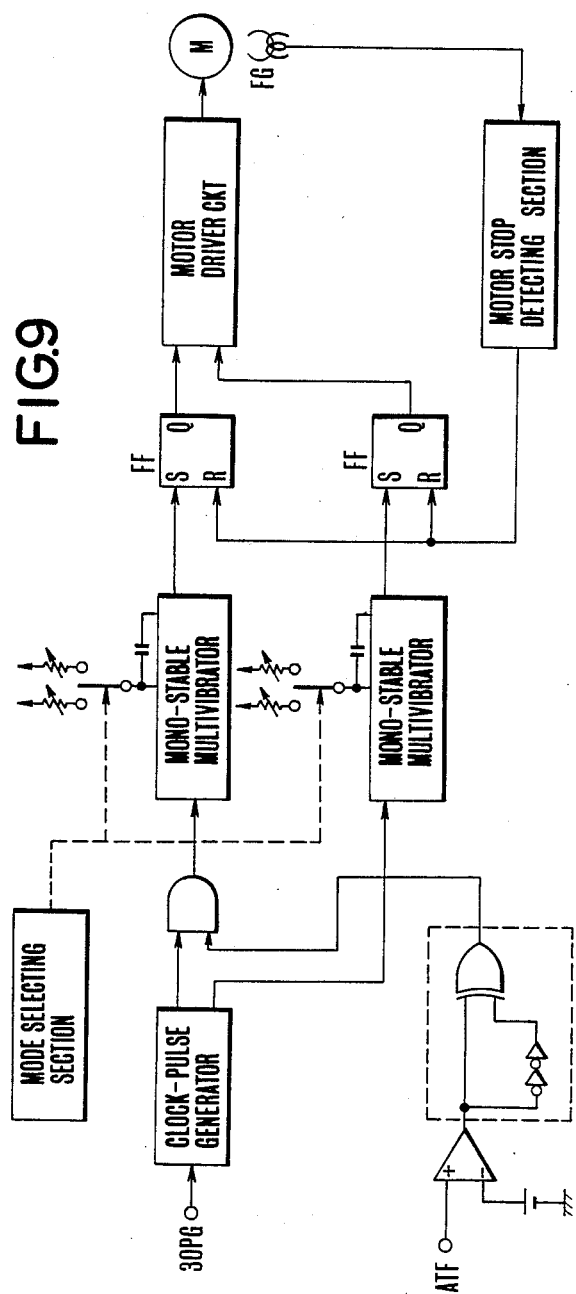
FIG. 9 is a block diagram showing the configuration of the important sections of a VTR comprising another embodiment of the present invention.

FIG. 9 shows a configuration in which the switches 108 and 109 for switching are omitted and the time constant of a mono-stable multi-vibrator is determined by various values of resistance being switched, in place of the above switches. The operation of FIG. 9 is the same as that of FIG. 8 and description is thus omitted.

As described above, in this embodiment, no particular control signal is recorded in the direction of the running of a recording medium and, even if a plurality of track pitches are set, it is possible to obtain good slow motion reproducing signals.

What is claimed is:

1. An apparatus for reproducing recorded signals from a tape-shaped recording medium in which a plurality of oblique tracks are formed in parallel, comprising:
(a) a reproducing head;
(b) means for forming a tracking error signal indicating a tracking error of said reproducing head by utilizing an output therefrom;
(c) transporting means for intermittently transporting said recording medium in a longitudinal direction thereof;
(d) pulse generating means for generating timing pulses in response to a level of said tracking error signal;
(e) delay means for delaying a timing indicated by said timing pulses;
(f) means for determining a start timing and a stop timing at which the transportation of said recording medium by said transporting means is started and stopped, said means determining either said start timing or said stop timing, or both, corresponding to the timing delayed by said delay means;
(g) a plurality of adjusting means arranged to be able to manually adjust a delay time given by said delay means;
(h) producing means for producing information with respect to a track pitch of said tracks; and
(i) selection means for selectively using said plurality of adjusting means on the basis of information produced by said producing means.

2. An apparatus according to claim 1, wherein said pulse generating means includes means for comparing the level of said tracking error signal with a predetermined level.

3. An apparatus according to claim 2, wherein said pulse generating means further comprises means for generating a timing pulse indicating a timing at which an output from said comparing means changes.

4. An apparatus according to claim 1, wherein said delay means comprises a plurality of delay circuits, and said plurality of adjusting means are respectively arranged to be able to adjust the delay time given by each of said plurality of delay circuits.

5. An apparatus according to claim 4, wherein said selection means includes a circuit for selectively outputting signals from said plurality of delay circuits.

6. An apparatus according to claim 4, wherein said plurality of delay circuits respectively includes a mono-stable multi-vibrator.

7. An apparatus according to claim 1, wherein said selection means includes a circuit for selectively connecting said plurality of adjusting means to said delay means.

8. An apparatus according to claim 7, wherein said delay means comprises a mono-stable multi-vibrator.

9. An apparatus according to claim 1, wherein said transporting means is so arranged that said recording medium is transported across a certain distance corresponding to said track pitch in accordance with said start timing and said stop timing.

10. An apparatus according to claim 9, wherein the video signals corresponding to one field are recorded in each of said tracks.

11. An apparatus for reproducing recorded signals from a tape-shaped recording medium in which a plurality of oblique tracks are formed in parallel, comprising:
(a) a reproducing head;
(b) means for forming a tracking error signal indicating a tracking error of said reproducing head by utilizing an output therefrom;

(c) transporting means for intermittently transporting said recording medium in a longitudinal direction thereof;
(d) pulse generating means for generating timing pulses in response to a level of said tracking error signal;
(e) delay means for delaying a timing indicated by said timing pulses;
(f) means for determining a start timing and a stop timing at which the transportation of said recording medium by said transporting means is started and stopped, said means determining either said start timing or said stop timing, or both, corresponding to the timing delayed by said delay means;
(g) a first adjusting means arranged to be able to manually adjust a delay time given by said delay means;
(h) producing means for producing information with respect to a track pitch of said tracks; and
(i) a second adjusting means arranged to adjust a delay time given by said delay means on the basis of the information produced by said producing means.

* * * * *